United States Patent
Hannigan et al.

(10) Patent No.: US 10,389,179 B2
(45) Date of Patent: Aug. 20, 2019

(54) WIRELESS POWER TRANSFER MANAGEMENT

(71) Applicant: Searete LLC, Bellevue, WA (US)

(72) Inventors: Russell J. Hannigan, Sammamish, WA (US); Guy Shlomo Lipworth, Durham, NC (US); Matthew S. Reynolds, Seattle, WA (US); Yaroslav A. Urzhumov, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 168 days.

(21) Appl. No.: 15/460,415

(22) Filed: Mar. 16, 2017

(65) Prior Publication Data

US 2018/0269715 A1     Sep. 20, 2018

(51) Int. Cl.
*H02J 50/10* (2016.01)
*H02J 50/60* (2016.01)

(52) U.S. Cl.
CPC .............. *H02J 50/10* (2016.02); *H02J 50/60* (2016.02)

(58) Field of Classification Search
CPC .................................. H02J 50/60; H02J 50/10
See application file for complete search history.

(56) References Cited

U.S. PATENT DOCUMENTS

| | | | | |
|---|---|---|---|---|
| 2009/0311977 A1* | 12/2009 | Yamashita | .......... | B60C 23/0416 455/91 |
| 2013/0300542 A1* | 11/2013 | Hansen | .................... | G07C 1/24 340/10.1 |
| 2015/0171516 A1* | 6/2015 | Chen | ....................... | H01Q 3/00 342/368 |
| 2016/0033254 A1 | 2/2016 | Zeine et al. | | |
| 2016/0197522 A1 | 7/2016 | Zeine et al. | | |
| 2016/0301217 A1 | 10/2016 | Zeine et al. | | |
| 2016/0301240 A1 | 10/2016 | Zeine et al. | | |

(Continued)

OTHER PUBLICATIONS

"Gaussian beam"; Wikipedia; Dec. 1, 2016; pp. 1-12; located at https://en.wikipedia.org/wiki/Gaussian_beam.

(Continued)

*Primary Examiner* — Jared Fureman
*Assistant Examiner* — Duc M Pham

(57) ABSTRACT

Described embodiments include a system and method. An antenna is configured to implement at least two selectable radiative electromagnetic field spatial distributions. Each selectable radiative electromagnetic field spatial distributions respectively has a bounding surface that describes a specified power density in the radiative electromagnetic field. A sensor circuit is configured to detect a presence of an object within the bounding surface of an implemented radiative electromagnetic field. A countermeasure circuit is configured to select a response to the detected presence of the object within the bounding surface of the implemented radiative electromagnetic field. A spatial distribution selector circuit is configured to select from the at least two selectable radiative electromagnetic field spatial distributions another radiative electromagnetic field spatial distribution (i) that includes a target device present within the bounding surface of the selected radiative electromagnetic field and (ii) that implements the selected response to the detected presence of the object.

38 Claims, 8 Drawing Sheets

(56) References Cited

U.S. PATENT DOCUMENTS

2017/0078013 A1* 3/2017 Sanderovich ............ H04B 7/10
2017/0338550 A1* 11/2017 Alon ................... H04B 17/102

OTHER PUBLICATIONS

Gowda et al.; "Wireless Power Transfer in the Radiative Near-Field"; Mar. 12, 2016; pp. 1-4; IEEE.
Smith et al; "An Analysis of Beamed Wireless Power Transfer in the Fresnel Zone Using a Dynamic, Metasurface Aperture"; Oct. 21, 2016; pp. 1-27; Journal of Applied Physics.

* cited by examiner

WIRELESS POWER TRANSFER MANAGEMENT

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example, and without limitation, an embodiment of the subject matter described herein includes a system. The system includes an antenna configured to implement at least two selectable radiative electromagnetic field spatial distributions. Each selectable radiative electromagnetic field spatial distributions of the at least two selectable radiative electromagnetic field spatial distributions has a respective bounding surface that describes a specified power density in the radiative electromagnetic field spatial distribution. The system includes a spatial distribution selector circuit configured to select from the at least two selectable radiative electromagnetic field spatial distributions a radiative electromagnetic field that includes a target device present within the bounding surface of the selected radiative electromagnetic field spatial distribution. The system includes a sensor circuit configured to detect a presence of an object within the bounding surface of the selected radiative electromagnetic field spatial distribution. The system includes a countermeasure circuit configured to select a response to the detected presence of the object within the bounding surface of the selected radiative electromagnetic field spatial distribution. The system includes a wireless power transfer management circuit configured to instruct the spatial distribution selector circuit to select from the at least two selectable radiative electromagnetic field spatial distributions another radiative electromagnetic field spatial distribution that (i) includes the target device present within the bounding surface of the selected radiative electromagnetic field spatial distribution and (ii) implements the selected response to the detected presence of the object. In an embodiment, the phrase "within the bounding surface" may be understood to mean that the object is either proximate to the bounding surface, at the bounding surface, or within the bounding surface as described.

In an embodiment, the system includes a zone protection circuit configured to detect a presence of another object within the bounding surface of the selected radiative electromagnetic field spatial distribution in response to a signal from a tag or transponder physically associated with the another object. In this embodiment, the countermeasure circuit is configured to select a response to the detected presence of the another object within the bounding surface of the selected radiative electromagnetic field spatial distribution.

In an embodiment, the system includes a wireless power transfer band selector configured to select an available a wireless power transfer sub-band in response to a radiofrequency spectrum sensing by the antenna of the transmission environment in which the antenna is located; and wherein the wireless power management circuit is further configured to initiate a wireless power transfer from the antenna to the target device using the selected sub-band.

For example, and without limitation, an embodiment of the subject matter described herein includes a system. The system includes an alternative embodiment of the system 205. The alternative embodiment of the system includes the spatial distribution selector circuit configured to select from at least two selectable radiative electromagnetic field spatial distributions of an antenna a radiative electromagnetic field that includes the target device 290 present within the bounding surface of the selected radiative electromagnetic field spatial distribution of the antenna 210. The antenna configured to implement the at least two selectable radiative electromagnetic field spatial distributions. Each of the selectable radiative electromagnetic field spatial distributions respectively having a bounding surface that describes a specified power density in the radiative electromagnetic field spatial distribution. The antenna is configured to implement the at least two selectable radiative electromagnetic field spatial distributions. Each of the selectable radiative electromagnetic field spatial distributions respectively having a bounding surface that describes a specified power density in the radiative electromagnetic field spatial distribution. The alternative embodiment of the system includes the sensor circuit 230 configured to detect a presence of the object 292 within a bounding surface of an implemented radiative electromagnetic field spatial distribution of at least two selectable radiative electromagnetic field spatial distributions of the antenna 210. The alternative embodiment of the system includes the countermeasure circuit 240 configured to select a response to the detected presence of the object within the bounding surface of the implemented radiative electromagnetic field spatial distribution. The alternative embodiment of the system includes a spatial distribution selector circuit 220 configured to select from the at least two selectable radiative electromagnetic field spatial distributions another radiative electromagnetic field spatial distribution (i) that includes a target device present within the bounding surface of the selected radiative electromagnetic field spatial distribution and (ii) that implements the selected response to the detected presence of the object. In an embodiment, the alternative embodiment of the system includes the antenna.

For example, and without limitation, an embodiment of the subject matter described herein includes a system. The system includes an antenna configured to implement at least two selectable radiative electromagnetic field spatial distributions. Each of the selectable radiative electromagnetic field spatial distributions respectively has a bounding surface that describes a specified power density in the radiative electromagnetic field spatial distribution. The system includes a sensor circuit configured to detect a presence of an object within the bounding surface of an implemented radiative electromagnetic field spatial distribution of the at least two selectable radiative electromagnetic field spatial distributions. The system includes a countermeasure circuit configured to select a response to the detected presence of the object within the bounding surface of the implemented radiative electromagnetic field spatial distribution. The system includes a spatial distribution selector circuit configured to select from the at least two selectable radiative electromagnetic field spatial distributions another radiative electromagnetic field spatial distribution (i) that includes a target device present within the bounding surface of the selected radiative electromagnetic field spatial distribution and (ii) that implements the selected response to the detected presence of the object. In an embodiment, the system includes a wireless power transfer management circuit configured to request the antenna to implement the another selected radiative electromagnetic field spatial distribution.

For example, and without limitation, an embodiment of the subject matter described herein includes a method. The method includes wirelessly transmitting electromagnetic power from an antenna to a target device using a selected radiative electromagnetic field spatial distribution. The antenna is configured to implement at least two selectable radiative electromagnetic field spatial distributions. Each of the at least two selectable radiative electromagnetic field spatial distributions respectively has a bounding surface that describes a specified power density in the radiative electromagnetic field spatial distribution. The method includes detecting a presence of an object within the bounding surface of the selected radiative electromagnetic field spatial distribution. The method includes selecting a countermeasure responsive to the detected presence of the object within the bounding surface of the selected radiative electromagnetic field spatial distribution. The method includes selecting from the at least two selectable radiative electromagnetic field spatial distributions another radiative electromagnetic field spatial distribution that (i) includes the target device present within the bounding surface of the selected radiative electromagnetic field spatial distribution and (ii) implements the selected countermeasure response to the detected presence of the object. The method includes wirelessly transmitting electromagnetic power from the antenna to the target device using the another selected radiative electromagnetic field spatial distribution.

For example, and without limitation, an embodiment of the subject matter described herein includes a method. The method includes detecting a presence of an object within a bounding surface of a radiative electromagnetic field spatial distribution. The radiative electromagnetic field spatial distribution is selected from at least two selectable radiative electromagnetic field spatial distributions implementable by an antenna. Each of the two selectable radiative electromagnetic field spatial distributions has a respective bounding surface that describes a specified power density in the radiative electromagnetic field spatial distribution. The method includes selecting a countermeasure responsive to the detected presence of the object within the bounding surface of the radiative electromagnetic field spatial distribution. The method includes selecting from the at least two selectable radiative electromagnetic field spatial distributions another radiative electromagnetic field that (i) includes the target device present within the bounding surface of the selected radiative electromagnetic field and (ii) implements the selected countermeasure response to the detected presence of the object. The method includes wirelessly transmitting electromagnetic power from the antenna to the target device using the another selected radiative electromagnetic field spatial distribution.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
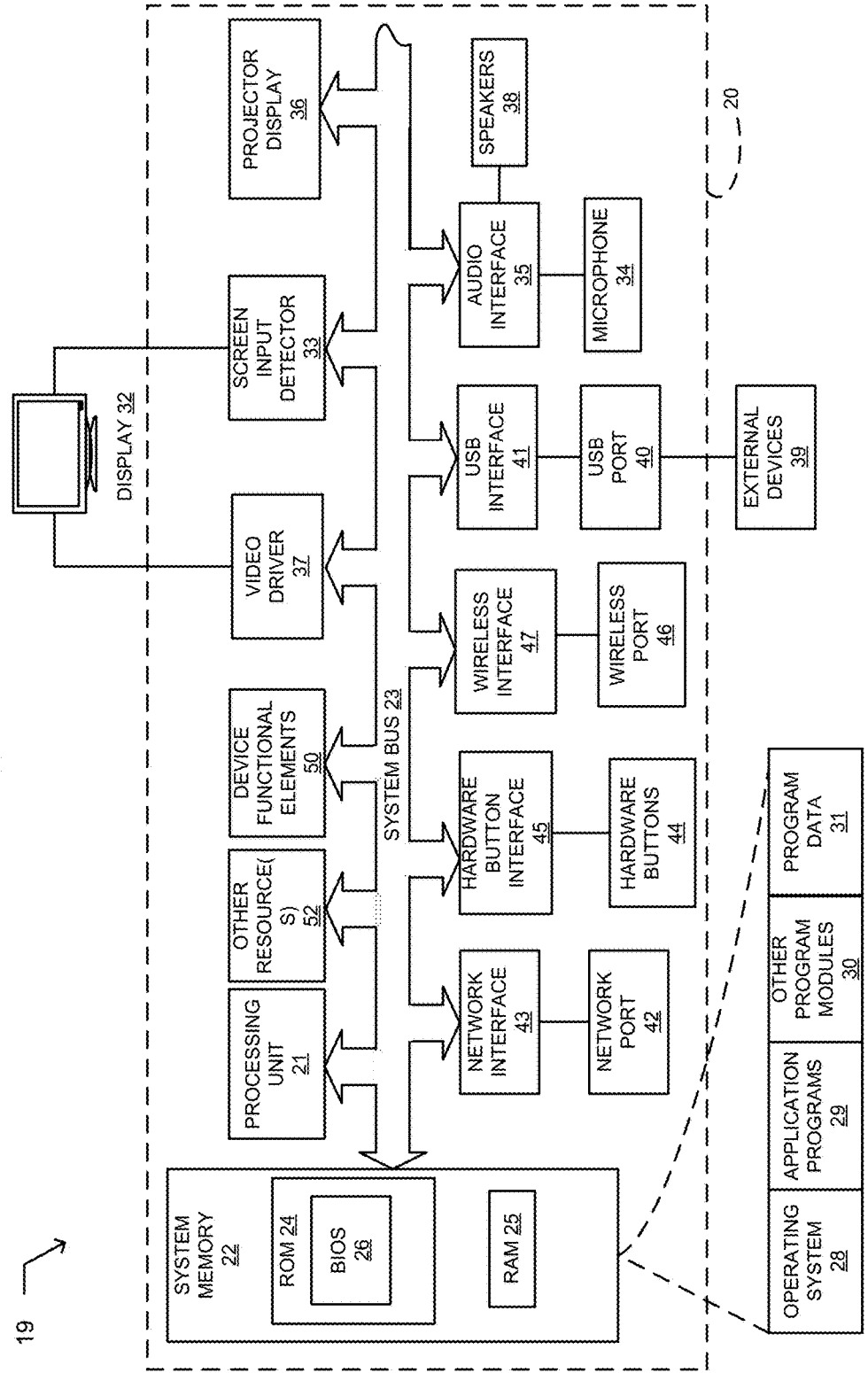
FIG. 1 illustrates an example embodiment of an environment that includes a thin computing device in which embodiments may be implemented.

This application makes reference to technologies described more fully in U.S. patent application Ser. No. 14/257,415, System Wirelessly Transferring Power to a Target Device Over a Modeled Transmission Pathway Without Exceeding a Radiation Limit for Human Beings, Tom Driscoll et al. as inventors, Apr. 21, 2014, is related to the present application. That application is incorporated by reference herein, including any subject matter included by reference in that application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "circuitry" or "electrical circuitry." Consequently, as used herein "circuitry" and "electrical circuitry" both include, but are not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Figure 2:
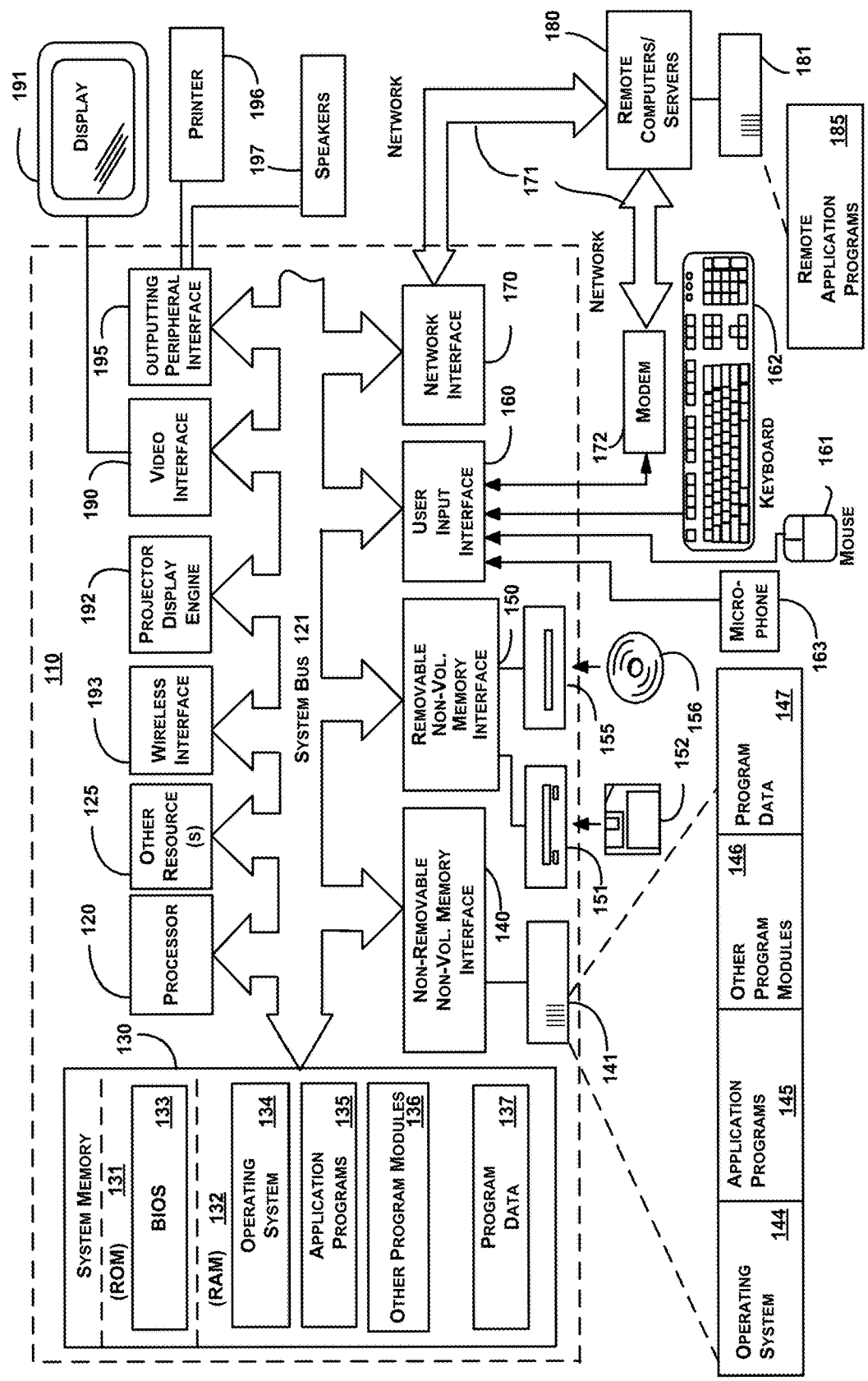
FIG. 2 illustrates an example environment that includes a general purpose computing device.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, or a tablet device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). The computing device may include other resource(s) 52. It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any nonvolatile media that can be accessed by the computing device 110, and may include removable or non-removable nonvolatile media. By way of example, and not of limitation, computer-readable media may include computer storage media.

Computer storage media includes removable and non-removable nonvolatile media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media. Computer storage media is a non-transitory computer-readable media.

The system memory 130 includes computer storage media in the form of nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services.

The computing device 110 may also include other removable/non-removable, nonvolatile computer readable storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150. The computing device may include other resource(s) 125.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing a communication link between the computers may be used.

In certain instances, one or more elements of the computing device 110 may be deemed not necessary and omitted. In other instances, one or more other elements may be deemed necessary and added to the computing device.

Figure 3:
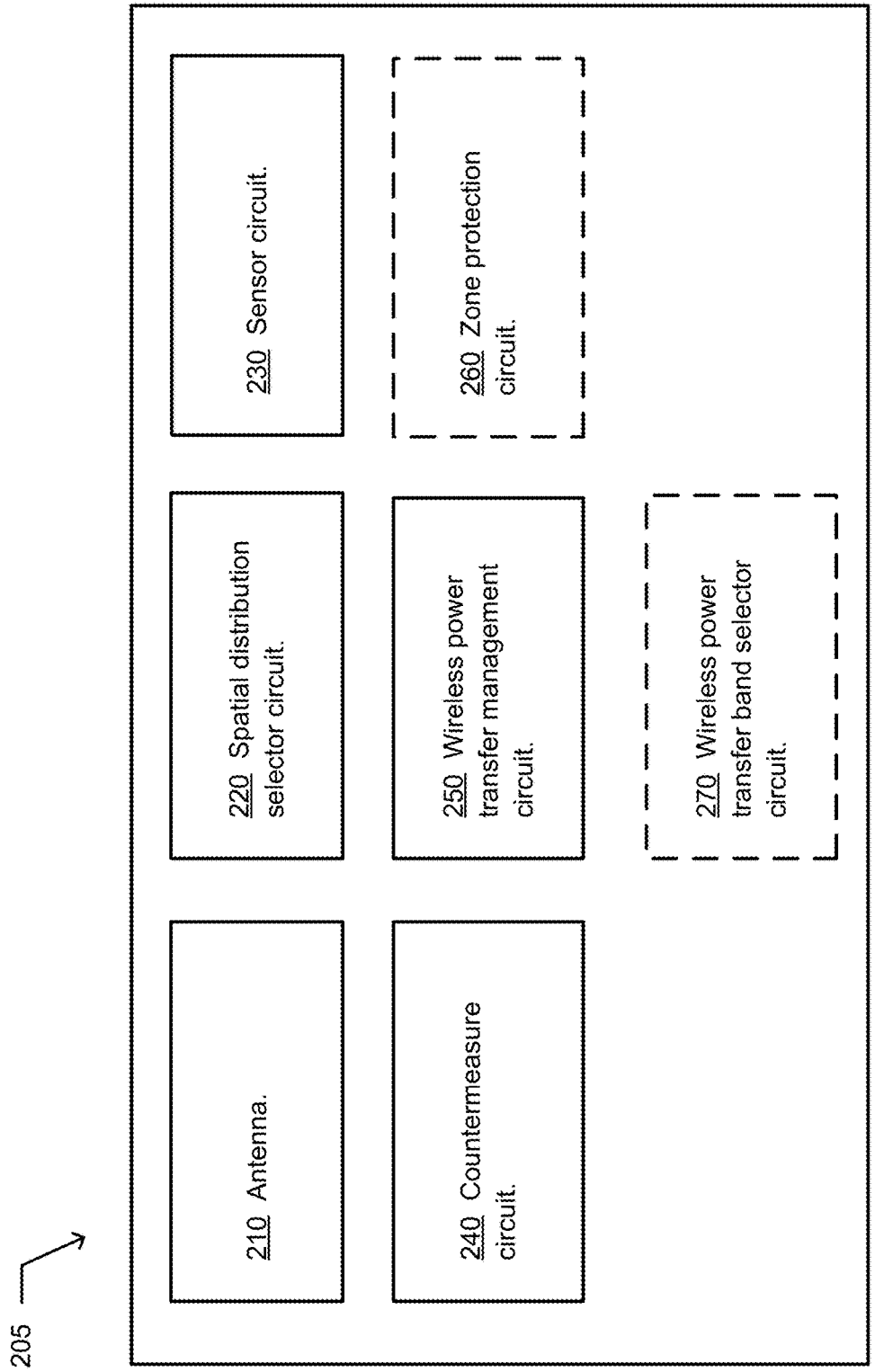
FIG. 3 illustrates a system that includes an antenna.
Figure 4:
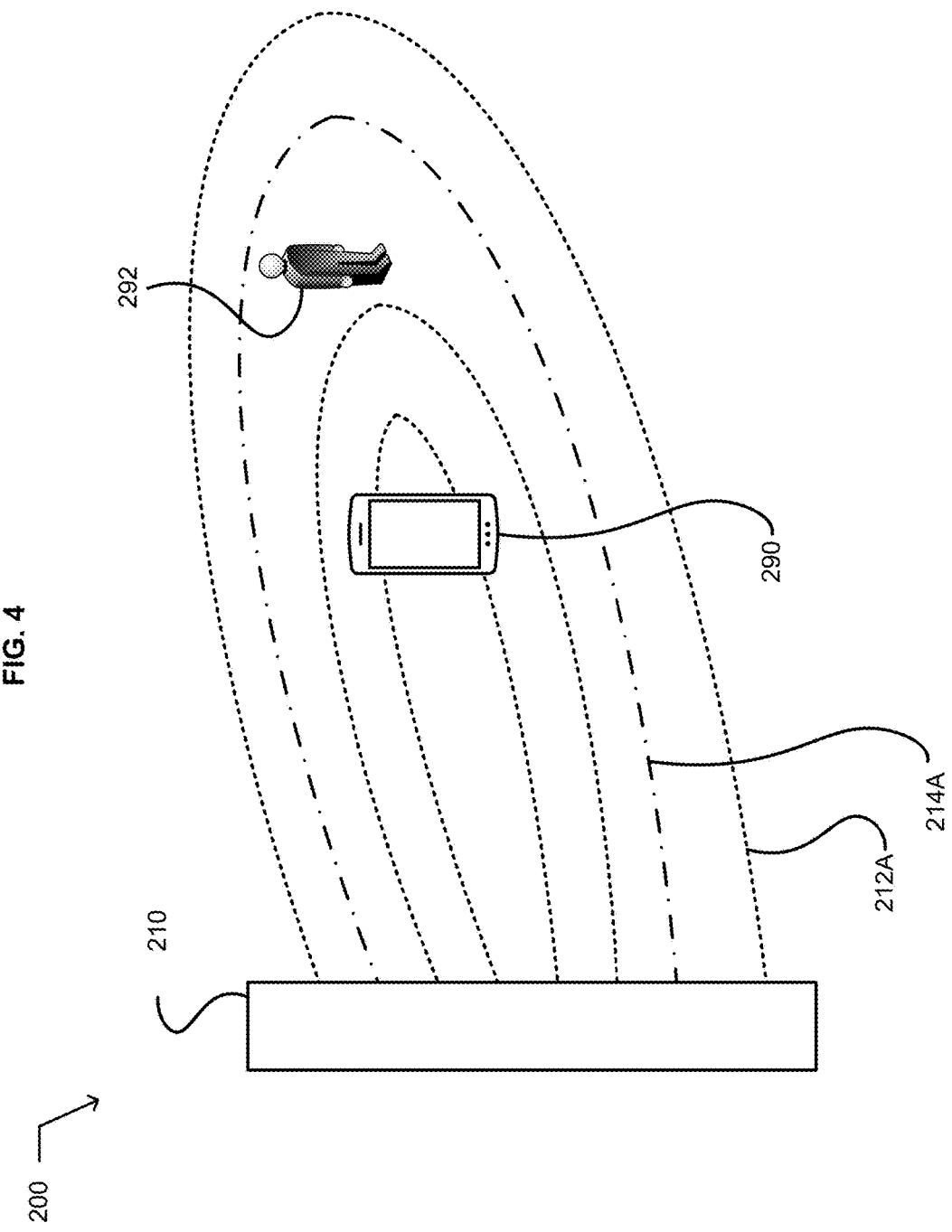
FIG. 4 illustrates an environment in which embodiments of the system may be implemented.
Figure 5:
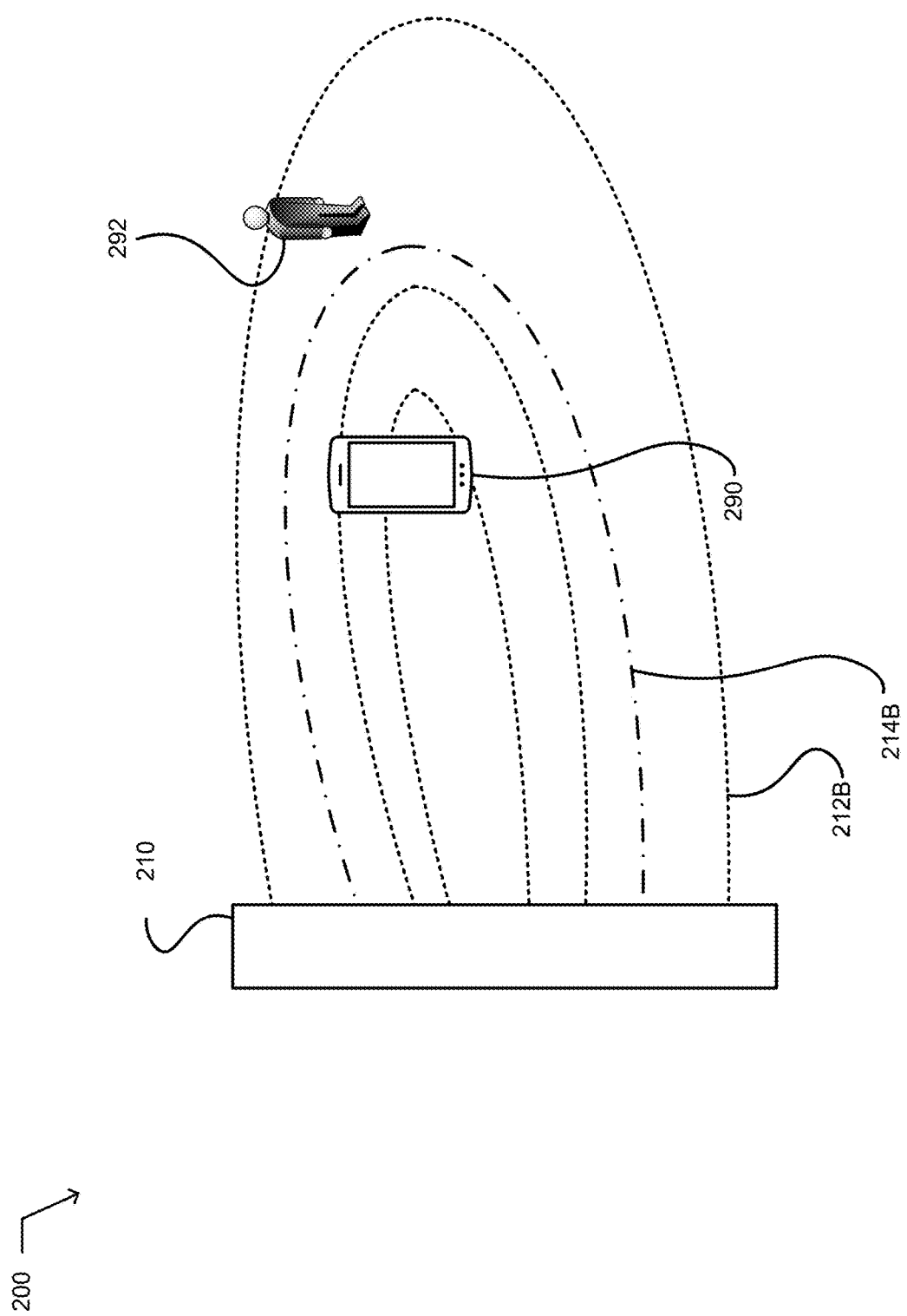
FIG. 5 illustrates an environment in which embodiments of the system may be implemented.

FIG. 3 illustrates a system 205 that includes an antenna 210. FIGS. 4 and 5 illustrate an environment 200 in which embodiments of the system may be implemented. FIGS. 4 and 5 illustrate a target device 290, an object 292, illustrated by a human profile, the antenna, a first example selectable radiative electromagnetic field spatial distribution 212A of the antenna, and a second example selectable radiative electromagnetic field spatial distribution 212B of the antenna. The system includes the antenna 210 configured to implement at least two selectable radiative electromagnetic field spatial distributions. Two selectable radiative electromagnetic field spatial distributions are illustrated by the first example selectable radiative electromagnetic field spatial distribution 212A, and the second example selectable radiative electromagnetic field spatial distribution 212B. Each selectable radiative electromagnetic field spatial distribution of the at least two selectable radiative electromagnetic field spatial distributions have a respective bounding surface that describes a specified power density in the radiative electromagnetic field spatial distribution. FIG. 4 illustrates the first example selectable radiative electromagnetic field spatial distribution 212A, which includes a first bounding surface 214A that describes a specified power density in the first example radiative electromagnetic field spatial distribution. FIG. 5 illustrates the second example selectable radiative electromagnetic field spatial distribution 212B that includes a second bounding surface 214B, which describes a specified power density in the second example radiative electromagnetic field spatial distribution.

The system 205 includes a spatial distribution selector circuit 220 configured to select from the at least two selectable radiative electromagnetic field spatial distributions a radiative electromagnetic field spatial distribution that includes the target device 290 present within the bounding surface of the selected radiative electromagnetic field spatial distribution. The system includes a sensor circuit 230 configured to detect a presence of the object 292 within the bounding surface of the selected radiative electromagnetic field spatial distribution. For example, in FIG. 4, the sensor circuit would detect the object 292 within the bounding surface 214A of the first example selectable radiative electromagnetic field spatial distribution 212A. In an embodiment, the phrase "within the bounding surface" should be understood to mean that the object is either proximate to the bounding surface, at the bounding surface, or within the bounding surface as described. The system includes a countermeasure circuit 240 configured to select a response to the detected presence of the object within the bounding surface of the selected radiative electromagnetic field spatial distribution. For example, in FIG. 5, the countermeasure circuit may select a response that includes maintaining the power density transmitted to the target device by changing the radiative electromagnetic field spatial distribution to reduce the power density at the object. The system includes a wireless power transfer management circuit 250 configured to instruct the spatial distribution selector circuit to select from the at least two selectable radiative electromagnetic field spatial distributions another radiative electromagnetic field spatial distribution that (i) includes the target device present within the bounding surface of the selected radiative electromagnetic field spatial distribution and (ii) implements the selected response to the detected presence of the object. In this example, the wireless power transfer management circuit would instruct the spatial distribution selector circuit to select the second example selectable radiative electromagnetic field spatial distribution 212B that includes a second bounding surface 214B that describes a specified power density in the second example radiative electromagnetic field spatial distribution wherein the target device 230 is within the second bounding surface 214B and the object 292 is outside the second bounding surface.

In an embodiment, a bounding surface, such as bounding surface 214A of FIG. 4 or 214B of FIG. 5, may be described as a spatial boundary or envelope where at the bounding surface the power density inside the bounding surface is above a power density limit, such as SARs, or other safety criteria, or conversely the power density outside the bounding surface is below a power density limit or other safety criteria. In some examples, the power density limit or other safety criteria may take into account, or be a mathematical formula of, time of exposure, such as in the specific absorption rate (SAR) safety criteria. For example, the power or energy density may be expressed in µw/cm2. For example, if the maximum power density in the radiative electromagnetic field was 400 µw/cm2, a bounding surface may be an envelope of 300 µw/cm2, or 75% of the maximum energy density. Power density may be a surface power density, for example expressed in µw/cm2 over a surface area of the bounding surface or a volumetric power density expressed as µw/cm3 at the bounding surface.

For example, the object 292 may include a person, pet, or animal to be protected from radiative electromagnetic fields having a power density above a specified level. In an embodiment, the system 205 is configured to operate a wireless power transmission system that avoids exposing objects to undesired EM radiation. The object can be organic (e.g. a human or animal entering the hazard field of the power transmitter, with specific absorption rate (SAR) requirements serving as a safety criteria or inorganic (e.g. an electromagnetic device, with electromagnetic interference (EMI requirements). Specific absorption rate (SAR) is a measure of the rate at which energy is absorbed by human or animal tissue when exposed to a radio frequency (RF) electromagnetic field; although, it can also refer to absorption of other forms of energy by tissue, including ultrasound. The SAR value may expressed in terms of watts per kilogram (W/kg) or milliwatts per gram (mW/g). The RF exposure limits are expressed in the terms of SAR, which is a measure of the electric and magnetic field strength and power density for transmitters operating at frequencies from 300 kHz to 100 GHz.]

In an embodiment, the antenna 210 is configured to implement at least two selectable radiative electromagnetic field wireless power transfer spatial distributions. In an embodiment, the antenna is configured to transfer wireless power using at least two selectable radiative electromagnetic field spatial distributions. In an embodiment, the antenna is configured to implement at least one of a direction, power level, phase, or amplitude component of each of the at least two selectable radiative electromagnetic field spatial distributions. In an embodiment, the each of the at least two selectable radiative electromagnetic field spatial distributions have a frequency range between about 1 and 100 GHz. In an embodiment, the antenna includes a mechanically reconfigurable antenna. For example, a mechanically reconfigurable antenna may include a parabolic antenna. In an embodiment, the mechanically reconfigurable antenna includes a physically steered antenna. In an embodiment, the antenna is configured as a reflector or reflectarray to redirect electromagnetic fields emitted by another antenna. In an embodiment, the antenna includes a phased array having at least one of a tunable phase shifter, tunable amplifier, or tunable attenuator. In an embodiment, the antenna includes an electronically reconfigurable antenna system. In an embodiment, the antenna includes a dynamically reconfigurable metasurface aperture or metasurface aperture. In an embodiment, the antenna includes a surface having a plurality of individual electromagnetic wave scattering elements distributed thereon with a periodic inter-element spacing equal to or less than one-half of a free space wavelength of an operating frequency of the antenna. In this embodiment, the aperture is configured to define the at least two radiative electromagnetic field spatial distributions on the surface with tangential wavenumbers up to $2\pi$ over the aperture periodic inter-element spacing (k_apt=$2\pi$/a). For example, embodiments of dynamically reconfigurable metasurface aperture or metasurface apertures are described in U.S. patent application Ser. No. 14/257,415, System Wirelessly Transferring Power to a Target Device Over a Modeled Transmission Pathway Without Exceeding a Radiation Limit for Human Beings, Tom Driscoll et al. as inventors, Apr. 21, 2014. That application is incorporated by reference herein, including any subject matter included by reference in that application.

In an embodiment of the antenna 210, the radiative electromagnetic field spatial distribution includes a Fresnel region radiative electromagnetic field spatial distribution. In an embodiment, the radiative electromagnetic field spatial distribution includes a Fraunhofer region radiative electromagnetic field spatial distribution. In an embodiment, the at least two selectable radiative electromagnetic field spatial distributions includes at least two selectable arbitrary radiative electromagnetic field spatial distributions. In an embodiment, the at least two selectable radiative electromagnetic field spatial distributions include at least two selectable radiative electromagnetic field spatial distributions.

In an embodiment of the antenna 210, the bounding surface, illustrated by the first bounding surface 214A in FIG. 4 and by the second bounding surface 214B in FIG. 5, includes a pre-characterized bounding surface. For example, a manufacturer of the antenna may provide a library of the at least two selectable radiative electromagnetic field spatial distributions that includes a pre-characterized bounding surface for each respective selectable radiative electromagnetic field spatial distribution. In an embodiment, the bounding surface includes an empirically characterized bounding surface. For example, a user of the antenna may conduct trial runs of the antenna in its existing environment or a sample environment and measure or characterize the bounding surface for each respective selectable radiative electromagnetic field spatial distribution. In an embodiment, the bounding surface includes a three-dimensional bounding surface. In an embodiment, the bounding surface encloses an electromagnetic hazard field. For example, the electromagnetic hazard field by be characterized by a SAR or other safety criteria for humans or animals. For example, the electromagnetic hazard field may be characterized by a safety regulation. For example, the electromagnetic hazard field by be characterized by a specified power density at the boundary. For example, the bounding surface may enclose or contains 90% of the maximum power or energy density of the radiative electromagnetic field spatial distribution. In an embodiment, the bounding surface is a spatial boundary or envelope where at the bounding surface the power density is above a SAR or other safety criteria. In an embodiment, the bounding surface is a spatial boundary or envelope where at the bounding surface the power density outside the bounding surface is below a SAR or other safety criteria. In an embodiment, the power density outside of the bounding surface never exceeds a specified value of power density. In this embodiment, this assures that the system would never exceed a prescribed absolute power density level outside of the bounding surface, and thus the system will be in compliance with a regulation limiting power density. For example, FIG. 4 illustrates an example where the power density outside the bounding surface 214B does not exceed a specified value, such as a SAR. For example, the power density may be expressed in cm2 or cm3.

In an embodiment of the wireless power transfer management circuit 250, the selected another radiative electromagnetic field spatial distribution includes a radiative electromagnetic field spatial distribution configured (i) to include the target device 290 spatially present within its bounding surface; and (ii) to wirelessly transfer electromagnetic power from the antenna 210 to a receiving antenna of the target device. In an embodiment, the wireless power transfer management circuit is configured to select the another radiative electromagnetic field spatial distribution from a library, or based upon a power transfer rate or a power transfer criteria.

In an embodiment of the sensor circuit 230, the object 292 includes a human, animal, active device, or passive scattering object within the bounding surface of the selected radiative electromagnetic field spatial distribution. In an embodiment, the sensor circuit is configured to detect a bearing of the object present within the bounding surface of the selected radiative electromagnetic field spatial distribution relative to the antenna. In an embodiment, the sensor circuit is configured to detect a distance between the object present within the bounding surface of the selected radiative electromagnetic field spatial distribution and the antenna. In an embodiment, the sensor circuit is configured to detect a bearing and a distance between the object present within the bounding surface of the selected radiative electromagnetic field spatial distribution and the antenna 210.

In an embodiment of the sensor circuit 230, the object 292 includes a human, an animal, or reflecting surface outside the bounding surface of the selected radiative electromagnetic field spatial distribution. In some embodiments, the sensor circuit is configured to detect a distance and/or a bearing between the object and the bounding surface. In some embodiments, the sensor circuit may be configured to estimate a velocity or rate of motion of the object. In an embodiment, the sensor circuit uses the distance and/or bearing, and/or estimated velocity or rate of motion of the object to estimate a length of time until the object is expected to meet or cross the bounding surface. In some embodiments, an estimation technique such as a Kalman filter, an extended Kalman filter, or another state-space approach may be used to estimate relative positions of the object and the bounding surface and/or the length of time until the object is expected to meet or cross the bounding surface.

In an embodiment, the sensor circuit 230 is configured to detect the object 292 present within the bounding surface of the selected radiative electromagnetic field spatial distribution in response to a signal indicative of a change in radiative electromagnetic power received by the target device 290 from the antenna 210. In an example embodiment, if an obstructing object 292 is present in a power transfer pathway between the antenna 210 and the target device, the power received by the target device will be reduced. In an embodiment, the target device may generate a signal indicative of the reduction in received power. In an embodiment, the signal may be transmitted in the same frequency band being used to wirelessly transfer power from the antenna to the target device; this may be called an in-band approach. In an embodiment, the signal may be transmitted in a different frequency band than is being used to wirelessly transfer power from the antenna to the target device; this may be called an out-of-band approach. In an embodiment, the sensor circuit performs the processing necessary to detect the presence of the object present within the bounding surface of the selected radiative electromagnetic field spatial distribution. In an embodiment, the signal is transmitted by the target device. For example, the signal may be transmitted in-band during a pause in transmission by the antenna or out of band over a housekeeping communication link. In an embodiment, the signal includes information indicative of an interference in the propagation channel between the antenna and the target device. In an embodiment, the propagation channel may include a transmission pathway. In an embodiment, the information processing may be performed by the target device. In an embodiment, the signal includes information indicative of a received power density at the target device. For example, the information indicative of an obstruction or interference in the transmission pathway may include information indicative of compliance with a SAR or other safety criteria at the obstruction or interference object. For example, the other safety criteria may include a power density at the obstruction or interference object. In an embodiment, the signal includes information indicative of a difference between a received power level and at least one previously received power level at the target device. For example, the difference provides a feedback on increase/decrease in received power when switching between different antenna illumination patterns. For example, this is expected to be useful in dynamic optimization. In an embodiment, the signal includes information indicative of a reflected radiative electromagnetic power received by the target device from the antenna. For example, the information may include information indicative of a phase shift, direction shift, or multipath. For example, the information may include information indicative of the object in the transmission pathway disrupting the power transfer. In some embodiments the information may include a channel impulse response (CIR) or a channel transfer function (CTF) between the antenna and the target device. In such embodiments, the CIR or CTF may be used to detect the presence of an obstruction or interference in the transmission pathway, for example by detecting a change in the CIR or CTF.

In an embodiment, the sensor circuit 230 is configured to detect the object 292 present within the bounding surface of the selected radiative electromagnetic field spatial distribution based on information responsive to a propagation channel test between the antenna and the target device. The propagation channel test may be used to measure the CIR or CTF. For example, the propagation channel test may disclose the object in the pathway and interfering with or blocking wireless power transmission. In an embodiment, the propagation channel test may be based on a signal transmitted from the antenna to the target device, from the target device to the antenna, or between another antenna and the target device. In an embodiment, the propagation channel test may be conducted in band during a pause in wireless power transmission by the antenna, or be conducted out-of-band over a housekeeping communication link. In an embodiment, the information is received from the target device. For example, the information may be processed at target device. In an embodiment, the information includes information indicative of an interference in the transmission pathway between the antenna and the target device. In another embodiment, the propagation channel test may take the form of a backscatter measurement whereby the target device selectively reflects at least a portion of the incident energy back toward the antenna. It should be appreciated that the backscatter measurement may also include the target device scattering at least a portion of the incident energy from the antenna toward a receiving antenna distinct from the transmitting antenna, whether or not the two antennas are co-located or proximate. In an embodiment, the propagation channel test includes transmission pathway test. In an embodiment, the sensor circuit is configured to detect a presence of an object proximate to, at, or within the bounding surface of the selected radiative electromagnetic field spatial distribution. In an embodiment, the countermeasure circuit 240 is configured to select a response to the detected presence of the object proximate to, at, or within the bounding surface of the selected radiative electromagnetic field spatial distribution.

In an embodiment, a selectable radiative electromagnetic field spatial distribution of the at least two selectable radiative electromagnetic field spatial distributions of the antenna 210 further includes a radiative electromagnetic field probe distribution. In this embodiment, the sensor circuit 230 is configured to detect the object 292 present within the bounding surface of a selected radiative electromagnetic field spatial distribution in response to a reflected energy from the radiative electromagnetic field probe distribution. For example, the reflected energy may include a reflection or phase shift in the radiative electromagnetic field probe distribution. For example, in an embodiment using a channel-matrix type approach, the same radiative electromagnetic field spatial distribution may be used both to transmit power and to probe for foreign objects. For example, the radiative electromagnetic field probe distribution is expected to sense a reflection of the transmitted energy, either with the antenna 210 or a direction sensitive antenna associated with the antenna 210. In an embodiment, the reflection may include an unexpected reflection. In an embodiment, the direction sensitive antenna may be located proximate to the antenna 210, or a distance from the antenna and configured to communicate with system 205. In an embodiment, the antenna 210 is further configured to operate in a bistatic, monostatic, pulsed, or continuous signal mode. In some embodiments a separate receiving antenna is used to receive the reflection from the foreign object; this is called a bistatic configuration. In an embodiment, the sensor circuit 230 is configured to detect a presence of the object within the bounding surface of the selected radiative electromagnetic field spatial distribution in a reflected energy from the radiative electromagnetic field probe distribution. In an embodiment, the sensor circuit is further configured to detect a location of the target device in response to the reflected energy from the radiative electromagnetic field probe distribution. For example, the return from the radiative electromagnetic field probe distribution may not need much resolution. This would allow use of a low power human safe transmit mode to probe the environment 200, or to probe for an efficient pathway to the target device 290. The sensor circuit 230 could then handshake with the wireless power transfer management circuit, which would then power up the antenna to its full output power. In some embodiments, the low power transmit mode may be configured to an output power low enough that a person, animal, or object proximate to the antenna could safely be continuously exposed to that level of output power.

In an embodiment, the sensor circuit 230 is further configured to detect a location of the target device 290 in response to an identification signal returned by the target device. For example, the target device may include a passive or active scattering apparatus returning a specific electromagnetic signature. This may sometimes be referred to as a backscatter approach. For example, the target device may include a semiconductor switchable apparatus that changes a reflectivity of the target device. The switching apparatus may be dynamic to provide a time-varying modulation of the scattering to create a unique signature. In some embodiments the time varying modulation of the scattering may include digital signals such as amplitude shift keying (ASK), phase shift keying (PSK), or combinations such as quadrature amplitude modulation (QAM) or orthogonal frequency domain multiplexing (OFDM). Examples of representative digitally encoded identification signal returns include an ACARS type protocol, ADS-B protocol, or a RACON protocol. Other examples of identification signal returns include a modulated scattering of a radiative electromagnetic beam by the target device, such as an RFID tag protocol in which the target device may encode a unique identifier and/or telemetry information, for example the incident power observed from the antenna and/or the observed CIR or CTF.

In an embodiment, the sensor circuit 230 includes an optical camera or structured light sensor configured to detect a presence of the target device 290 or object 292 within the bounding surface of the selected radiative electromagnetic field spatial distribution. In an embodiment, the sensor circuit includes a passive infrared sensor or thermal imaging sensor configured to detect a presence of the object within the bounding surface of the selected radiative electromagnetic field spatial distribution. In an embodiment, a passive infrared sensor (PIR sensor) or thermal imaging sensor may be used to detect a presence of the target device 290 or object 292. In an embodiment, the sensor circuit includes an acoustic microphone and a signal processing circuit configured to detect and identify acoustic signatures of at least one of the human, animal, or active device. In an embodiment, the sensor circuit includes an acoustic sonar and a signal processing circuit configured to detect and identify sonar signatures of at least one of the human, animal, active device or passive scattering object. In an embodiment, the sonar and the signal processing circuit is configured to estimate range and/or bearing to the human, animal, active device or passive scattering object that is detected. In an embodiment, the sensor circuit includes another antenna configured to transmit another electromagnetic beam and receive a reflected energy of the another electromagnetic beam from the target device or the object. In one approach, an off-the-shelf automotive radar system may be used to sense the target device or the object. In an embodiment, the reflected energy indicates a presence of the object within the bounding surface of the selected radiative electromagnetic field spatial distribution. In an embodiment, the another electromagnetic beam includes a radiofrequency beam or a light frequency beam. In an embodiment, the reflected energy includes a Doppler return. In an embodiment, the sensor circuit is configured to detect a presence of the object within the bounding surface of the selected radiative electromagnetic field spatial distribution in response to a signal from a tag or transponder physically associated with the object. In an embodiment, the sensor circuit is configured to detect a presence of the object within the bounding surface of the selected radiative electromagnetic field spatial distribution in response to an interference reporting signal from a tag or transponder physically associated with another object.

In an embodiment, the system 205 includes a zone protection circuit 260 configured to detect a presence of another object within the bounding surface of the selected radiative electromagnetic field spatial distribution in response to a signal from a tag or transponder physically associated with the another object. In this embodiment, the countermeasure circuit 240 is configured to select a response to the detected presence of the another object within the bounding surface of the selected radiative electromagnetic field spatial distribution. In an embodiment, a tag or transponder may be used to identify keep-away zones. For example, the tag or transponder may include a military ordinance tag or an aircraft transponder. In one embodiment, the system may be operated such that unwanted energy may continue beyond the target device and inadvertently illuminate an aircraft or ground vehicle, and the zone protection circuit may select a response to the detected presence of the aircraft or ground vehicle to avoid or minimize the illumination of the aircraft or ground vehicle.

In an embodiment, the sensor circuit 230 is configured to detect a presence of the object 292 within the bounding surface of the selected radiative electromagnetic field spatial distribution in response to a signal from a wireless device generally carried by or physically associated with a human or an animal. For example, the wireless device may include a cellphone, smart phone, tablet, laptop, or other wireless enabled device. For example, the wireless device may include a pet collar having a transmitter or transponder. In some examples, if one of the aforementioned wireless devices are detected, the sensor circuit may assume that a human is present and therefore respond in the same manner as if a human were detected directly. In some embodiments, an animal such as a pet may be provided with a transmitter or transponder on its collar to make its identity and/or presence known to the sensor circuit such that the sensor circuit may respond in the same manner as if the animal were detected directly. In an embodiment, the system 205 includes a wireless power transfer band selector 270 configured to select a transfer radiofrequency sub-band available for wireless power transfer sub-band in response to a spectrum sensing of the transmission environment in which the antenna 210 is located. In an embodiment, the spectrum sensing may be implemented using the antenna. The wireless power management circuit 250 is further configured to initiate a wireless power transfer from the antenna to the target device 290 using the selected sub-band.

In an embodiment, the sensor circuit 230 is configured to detect a presence of the object 292 within the bounding surface of the selected radiative electromagnetic field spatial distribution in response to a spectrum sensing of the environment 200 in which the antenna is located to determine if a particular radiofrequency transfer sub-band is unoccupied prior to enabling a wireless power transfer operation. For example, the antenna 210 may use spectrum sensing to detect other devices in environment, possibly carried by a human object.

In an embodiment, the countermeasure circuit 240 is configured to select a response to the detected presence of the object 292 from a library of the at least two selectable responses to the detected presence of the object. In some embodiments, the at least two selectable responses may include at least two values of a continuous variable, such as at least two power levels. In an embodiment, the countermeasure circuit is configured to select a response to the detected presence of the object based on trial and error, or a brute force optimization technique. For example, the countermeasure circuit may blindly make the changes to power level or radiative electromagnetic field spatial distribution, and use information from the target device 290 to determine whether the change resulted in increasing the power transfer. For example, the countermeasure circuit may blindly and iteratively make the changes to power level or radiative electromagnetic field spatial distribution, and use information from the target device to determine whether the change resulted in increasing the power transfer. For example, the countermeasure circuit may iteratively make the changes to power level or radiative electromagnetic field spatial distribution, and use information from the target device to determine whether the change resulted in increasing the power transfer. For example, the countermeasure circuit may make supervised changes to power level or radiative electromagnetic field spatial distribution, and use information from the target device to determine whether the change resulted in increasing the power transfer. For example, the countermeasure circuit may make the changes to power level or radiative electromagnetic field spatial distribution, and use information from the target device to determine whether the change resulted in improved compliance with a SAR or other safety criteria. For example, the countermeasure circuit may make the changes to power level or radiative electromagnetic field spatial distribution, and use information from the target device to determine whether the change resulted in improved avoidance of the object 292. In an embodiment, the countermeasure circuit is configured to select a response to the detected presence of the object based on a feedback-guided optimization loop. In an embodiment, the response selected by the countermeasure circuit includes a reduction of the power transmitted by the antenna in response to the detected presence of the object. In an embodiment, the response selected by the countermeasure circuit includes a redirection of the power transmitted by the antenna away from the object. In an embodiment, the countermeasure circuit is configured to select a termination of a transmission of wireless power in response to the detected presence of the object. In an embodiment, the response selected by the countermeasure circuit includes a reconfiguration of the radiative electromagnetic field spatial distribution away from the object. For example, the countermeasure circuit may select a reconfiguration of the radiative electromagnetic field spatial distribution to reduce the power density directed at a human or animal. For example, the reconfiguration may include moving lobes or nulls, or changing a gain pattern of the antenna 210.

In an embodiment, the wireless power transfer management circuit 250 is configured to signal the antenna 210 to implement the selected radiative electromagnetic field spatial distribution that includes the target device 290 present within the bounding surface of the selected radiative electromagnetic field spatial distribution and that implements the selected response to the detected presence of the object 292.

FIG. 3 illustrates an alternative embodiment of the system 205. The alternative embodiment of the system includes the spatial distribution selector circuit configured to select from at least two selectable radiative electromagnetic field spatial distributions of an antenna a radiative electromagnetic field that includes the target device 290 present within the bounding surface of the selected radiative electromagnetic field spatial distribution of the antenna 210. The antenna configured to implement the at least two selectable radiative electromagnetic field spatial distributions. Each of the selectable radiative electromagnetic field spatial distributions respectively having a bounding surface that describes a specified power density in the radiative electromagnetic field spatial distribution. The antenna is configured to implement the at least two selectable radiative electromagnetic field spatial distributions. Each of the selectable radiative electromagnetic field spatial distributions respectively having a bounding surface that describes a specified power density in the radiative electromagnetic field spatial distribution. The alternative embodiment of the system includes the sensor circuit 230 configured to detect a presence of the object 292 within a bounding surface of an implemented radiative electromagnetic field spatial distribution of at least two selectable radiative electromagnetic field spatial distributions of the antenna 210. The alternative embodiment of the system includes the countermeasure circuit 240 configured to select a response to the detected presence of the object within the bounding surface of the implemented radiative electromagnetic field spatial distribution. The alternative embodiment of the system includes a spatial distribution selector circuit 220 configured to select from the at least two selectable radiative electromagnetic field spatial distributions another radiative electromagnetic field spatial distribution (i) that includes a target device present within the bounding surface of the selected radiative electromagnetic field spatial distribution and (ii) that implements the selected response to the detected presence of the object. In an embodiment, the alternative embodiment of the system includes the antenna.

Figure 6:
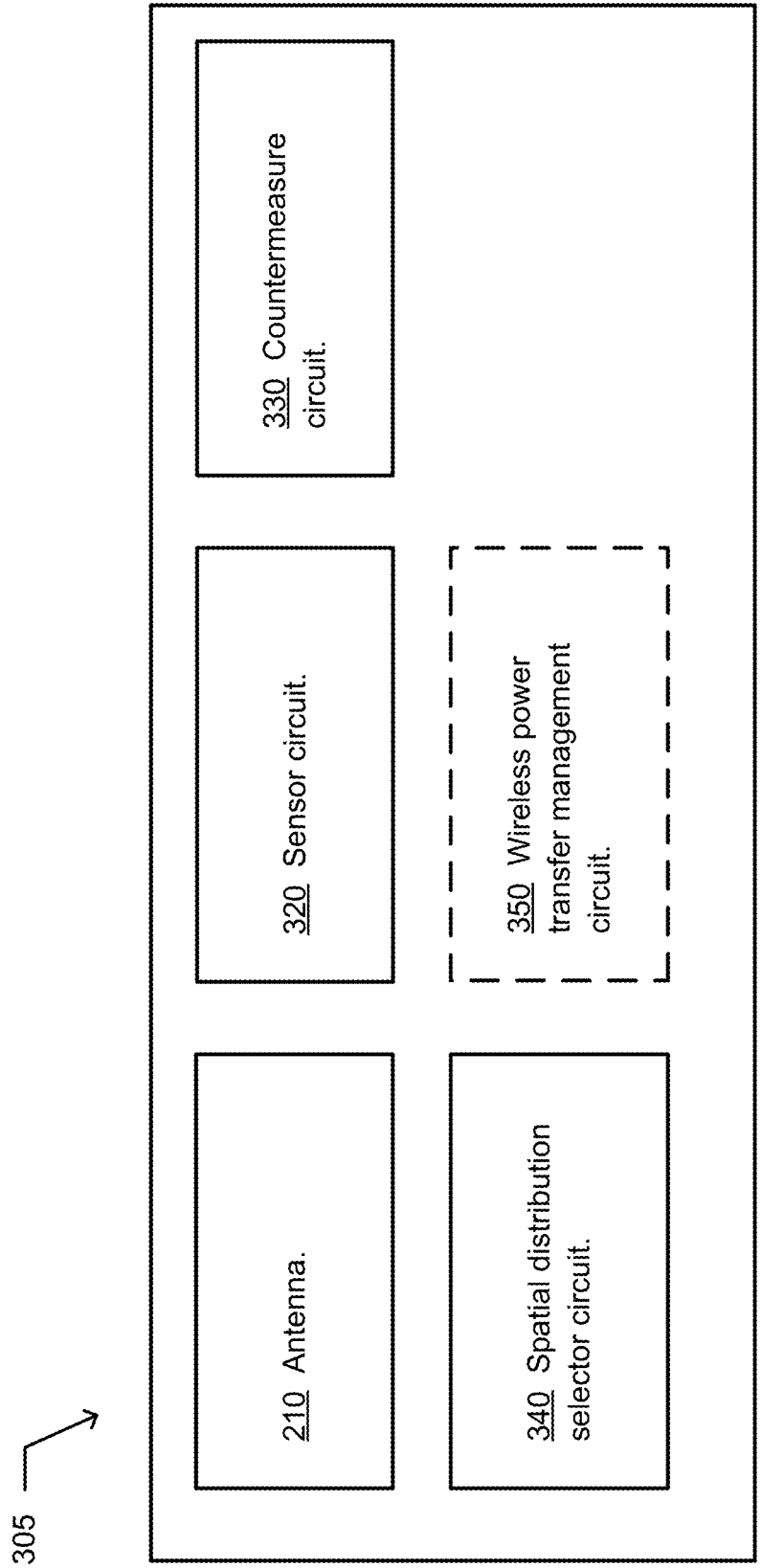
FIG. 6 illustrates an example system.

FIG. 6 illustrates an example system 305. In an embodiment, the system may be implemented in the environment 200 described in conjunction with FIGS. 4 and 5. The system includes an antenna 210 configured to implement at least two selectable radiative electromagnetic field spatial distributions, illustrated by the first selectable radiative electromagnetic field spatial distribution 212A in FIG. 4 and by the second selectable radiative electromagnetic field spatial distribution 212B in FIG. 5. Each of the selectable radiative electromagnetic field spatial distributions respectively have a bounding surface that describes a specified power density in the radiative electromagnetic field. The respective bounding surfaces illustrated by the first bounding surface 214A in FIG. 4 and by the second bounding surface 214B in FIG. 5.

The system includes 305 includes a sensor circuit 320 configured to detect a presence of the object 292 within the bounding surface of an implemented radiative electromagnetic field spatial distribution of the at least two selectable radiative electromagnetic field spatial distributions. The system includes a countermeasure circuit 330 configured to select a response to the detected presence of the object within the bounding surface of the implemented radiative electromagnetic field spatial distribution. The system includes a spatial distribution selector circuit 340 configured to select from the at least two selectable radiative electromagnetic field spatial distributions another radiative electromagnetic field spatial distribution (i) that includes a target device 290 present within the bounding surface of the selected radiative electromagnetic field spatial distribution and (ii) that implements the selected response to the detected presence of the object. In an embodiment, the system 305 includes a wireless power transfer management circuit 350 configured to request the antenna 210 implement the another selected radiative electromagnetic field spatial distribution.

Figure 7:
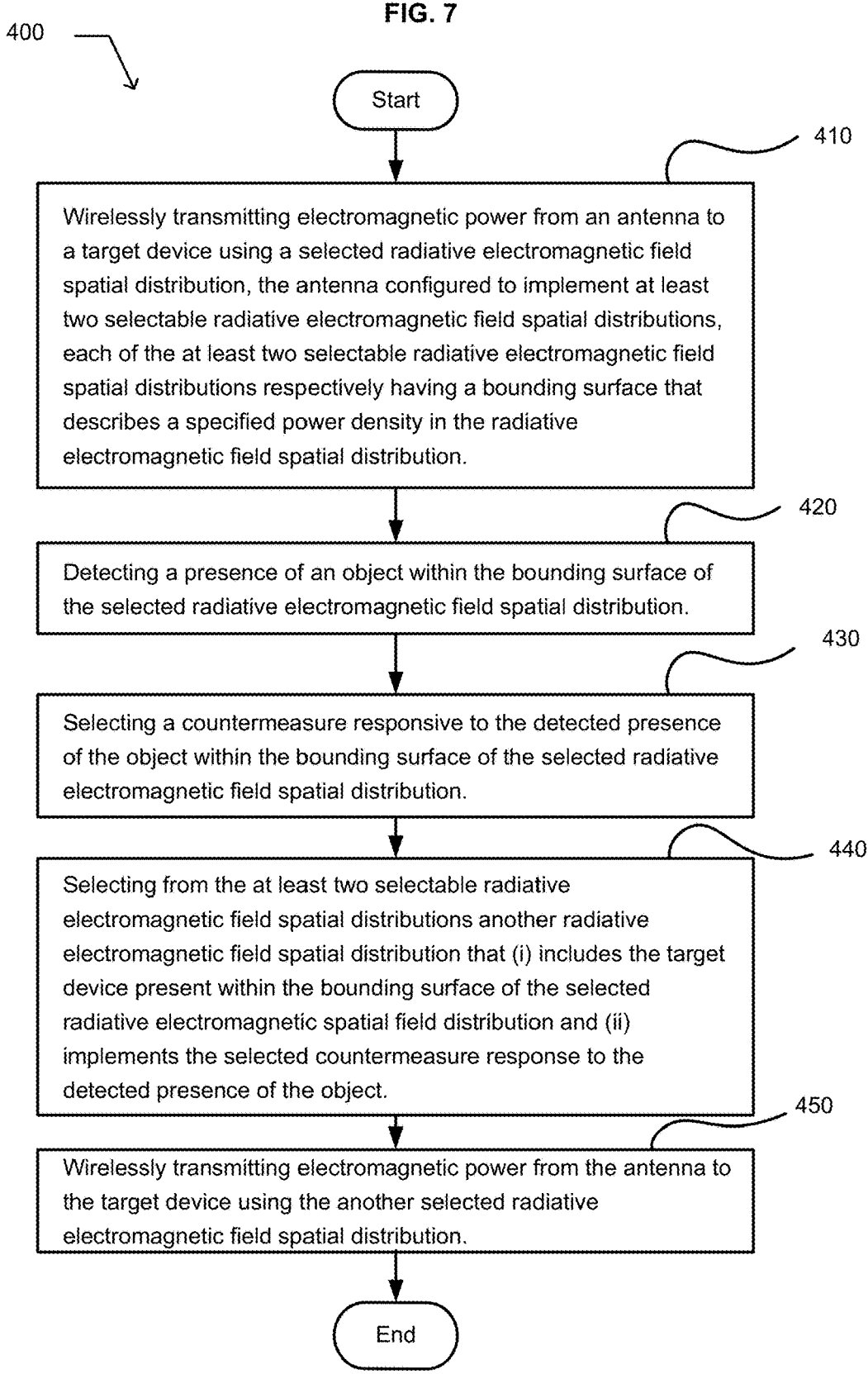
FIG. 7 illustrates an example operational flow.

FIG. 7 illustrates an example operational flow 400. After a start operation, the operational flow includes a first power beaming operation 410. The first power beaming operation includes wirelessly transmitting electromagnetic power from an antenna to a target device using a selected radiative electromagnetic field spatial distribution. The antenna is configured to implement at least two selectable radiative electromagnetic field spatial distributions. Each of the at least two selectable radiative electromagnetic field spatial distributions respectively have a bounding surface that describes a specified power density in the radiative electromagnetic field spatial distribution. For example, the first power beaming operation may be implemented using the antenna 210 described in conjunction with FIG. 3. A discovery operation 420 includes detecting a presence of an object within the bounding surface of the selected radiative electromagnetic field spatial distribution. In an embodiment, the discovery operation may be implemented using the sensor circuit 230 described in conjunction with FIG. 3. A first choosing operation 430 includes selecting a countermeasure responsive to the detected presence of the object within the bounding surface of the selected radiative electromagnetic field spatial distribution. In an embodiment, the first choosing operation may be implemented using the countermeasure circuit 240 described in conjunction with FIG. 3. A second choosing operation 440 includes selecting from the at least two selectable radiative electromagnetic field spatial distributions another radiative electromagnetic field spatial distribution that (i) includes the target device present within the bounding surface of the selected radiative electromagnetic field spatial distribution and (ii) implements the selected countermeasure response to the detected presence of the object. In an embodiment, the second choosing operation may be implemented using the wireless power transfer management circuit 250 described in conjunction with FIG. 3. A second power beaming operation 450 includes wirelessly transmitting electromagnetic power from the antenna to the target device using the another selected radiative electromagnetic field spatial distribution. In an embodiment, the second power beaming operation may be implemented using the antenna 210 described in conjunction with FIG. 3. The operational flow includes an end operation.

Figure 8:
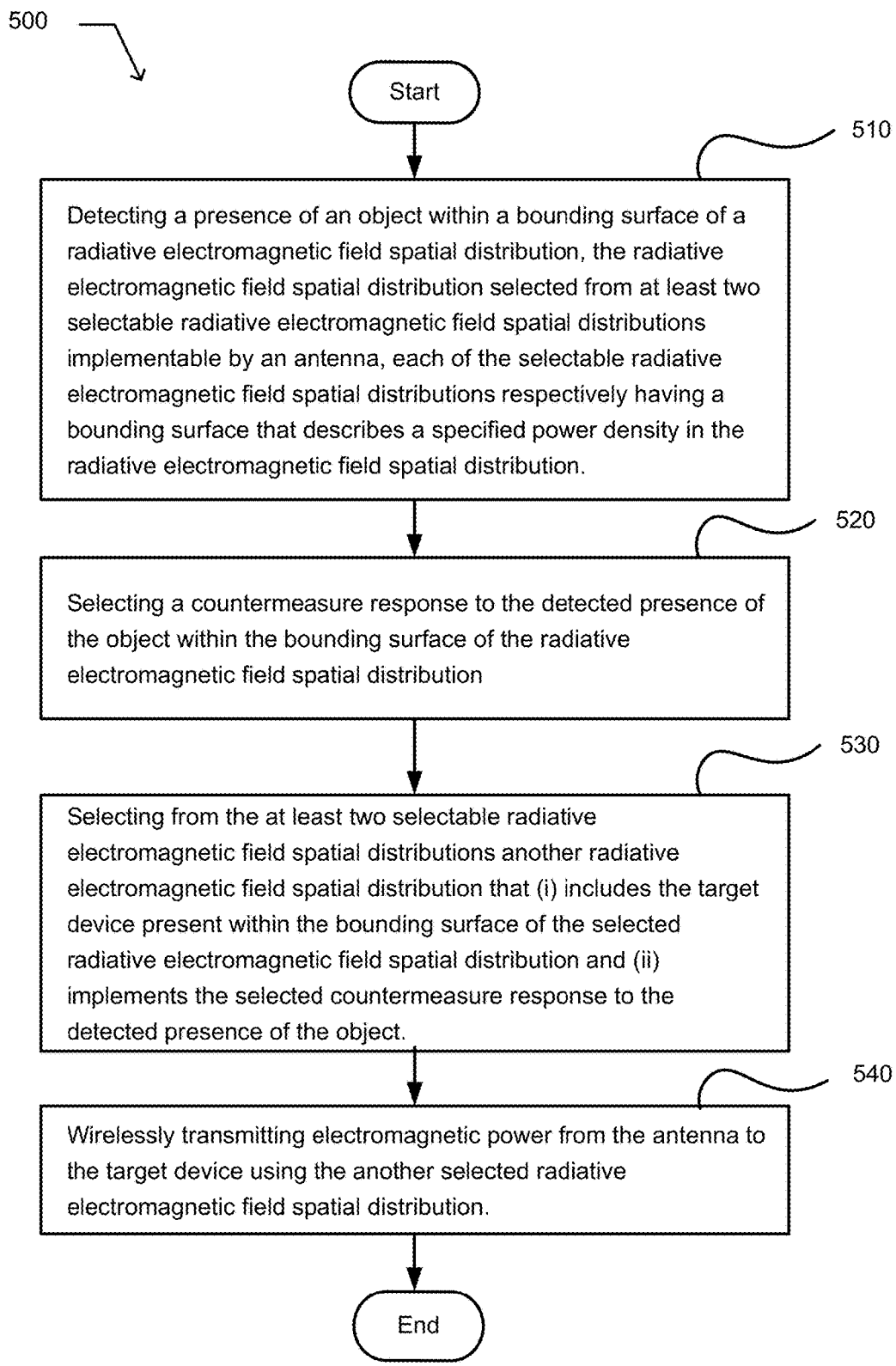
FIG. 8 illustrates an example operational flow.

FIG. 8 illustrates an example operational flow 500. After a start operation, the operational flow includes a discovery operation 510. The discovery operation includes detecting a presence of an object within a bounding surface of a radiative electromagnetic field spatial distribution. The radiative electromagnetic field spatial distribution is selected from at least two selectable radiative electromagnetic field spatial distributions implementable by an antenna. Each of the two selectable radiative electromagnetic field spatial distributions have a respective bounding surface that describes a specified power density in the radiative electromagnetic field spatial distribution. In an embodiment, the discovery operation may be implemented using the sensor circuit 320 described in conjunction with FIG. 6. A first choosing operation 520 includes selecting a countermeasure responsive to the detected presence of the object within the bounding surface of the radiative electromagnetic field spatial distribution. In an embodiment, the first choosing operation may be implemented using the countermeasure circuit 330 described in conjunction with FIG. 3. A second choosing operation 530 includes selecting from the at least two selectable radiative electromagnetic field spatial distributions another radiative electromagnetic field spatial distribution that (i) includes the target device present within the bounding surface of the selected radiative electromagnetic field spatial distribution and (ii) implements the selected countermeasure response to the detected presence of the object. The second choosing operation may be implemented using the spatial distribution selector circuit 340 described in conjunction with FIG. 6. A power beaming operation 540 includes wirelessly transmitting electromagnetic power from the antenna to the target device using the another selected radiative electromagnetic field spatial distribution. In an embodiment, the power beaming operation may be implemented using the antenna 210 described in conjunction with FIG. 6. The operational flow includes an end operation.

All references cited herein are hereby incorporated by reference in their entirety or to the extent their subject matter is not otherwise inconsistent herewith.

In some embodiments, "configured" or "configured to" includes at least one of designed, set up, shaped, implemented, constructed, or adapted for at least one of a particular purpose, application, or function. In some embodiments, "configured" or "configured to" includes positioned, oriented, or structured for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system comprising:
an antenna configured to implement at least two selectable radiative electromagnetic field spatial distributions, each selectable radiative electromagnetic field spatial distribution of the at least two selectable radiative electromagnetic field spatial distributions having a respective bounding surface that describes a specified power density in the radiative electromagnetic field spatial distribution;
a spatial distribution selector circuit configured to select from the at least two selectable radiative electromagnetic field spatial distributions a radiative electromagnetic field that includes a target device present within the bounding surface of the selected radiative electromagnetic field spatial distribution;
a sensor circuit configured to detect a presence of an object within the bounding surface of the selected radiative electromagnetic field spatial distribution;
a countermeasure circuit configured to select a response to the detected presence of the object within the bounding surface of the selected radiative electromagnetic field spatial distribution; and
a wireless power transfer management circuit configured to instruct the spatial distribution selector circuit to select from the at least two selectable radiative electromagnetic field spatial distributions another radiative electromagnetic field spatial distribution that (i) includes the target device present within the bounding surface of the selected radiative electromagnetic field spatial distribution and (ii) implements the selected response to the detected presence of the object;
wherein the bounding surface includes a three-dimensional bounding surface.

2. The system of claim 1, wherein the antenna is configured to implement at least two selectable radiative electromagnetic field wireless power transfer spatial distributions.

3. The system of claim 1, wherein the antenna is configured to transfer wireless power using at least two selectable radiative electromagnetic field spatial distributions.

4. The system of claim 1, wherein the antenna is configured to implement at least one of a direction, power level, phase, or amplitude component of each of the at least two selectable radiative electromagnetic field spatial distributions.

5. The system of claim 1, wherein each of the at least two selectable radiative electromagnetic field spatial distributions have a frequency range between about 1 and 100 GHz.

6. The system of claim 1, wherein the antenna is configured to redirect electromagnetic fields emitted by another antenna.

7. The system of claim 1, wherein the antenna includes a phased array having at least one of a tunable phase shifter, tunable amplifier, or tunable attenuator.

8. The system of claim 1, wherein the antenna includes an electronically reconfigurable antenna system.

9. The system of claim 1, wherein the antenna includes a dynamically reconfigurable metasurface aperture.

10. The system of claim 1, wherein the antenna includes a surface having a plurality of individual electromagnetic wave scattering elements distributed thereon with a periodic inter-element spacing equal to less than one-half of a free space wavelength of an operating frequency of the antenna, the aperture configured to define the at least two radiative electromagnetic field spatial distributions on the surface with tangential wavenumbers up to a over the aperture periodic inter-element spacing (k_apt=$2\pi/a$).

11. The system of claim 1, wherein the radiative electromagnetic field spatial distribution includes a Fresnel region radiative electromagnetic field spatial distribution.

12. The system of claim 1, wherein the radiative electromagnetic field spatial distribution includes a Fraunhofer region radiative electromagnetic field spatial distribution.

13. The system of claim 1, wherein the at least two selectable radiative electromagnetic field spatial distributions includes at least two selectable arbitrary radiative electromagnetic field spatial distributions.

14. The system of claim 1, wherein the at least two selectable radiative electromagnetic field spatial distributions include at least two selectable radiative electromagnetic field spatial distributions.

15. The system of claim 1, wherein the bounding surface includes a pre-characterized bounding surface.

16. The system of claim 1, wherein the bounding surface includes an empirically characterized bounding surface.

17. The system of claim 1, wherein the bounding surface encloses an electromagnetic hazard field.

18. The system of claim 1, wherein the power density outside of the bounding surface never exceeds a specified power density.

19. The system of claim 1, wherein the selected another radiative electromagnetic field spatial distribution includes a radiative electromagnetic field spatial distribution configured (i) to include the target device present within its bounding surface; and (ii) to wirelessly transfer electromagnetic power from the antenna to the target device.

20. The system of claim 1, wherein the sensor circuit is configured to detect a bearing of the object present within the bounding surface of the selected radiative electromagnetic field spatial distribution relative to the antenna.

21. The system of claim 20, wherein the sensor circuit is configured to detect a bearing and a distance between the object present within the bounding surface of the selected radiative electromagnetic field spatial distribution and the antenna.

22. The system of claim 1, wherein the sensor circuit is configured to detect the object present within the bounding surface of the selected radiative electromagnetic field spatial distribution in response to a signal indicative of a change in radiative electromagnetic power received by the target device from the antenna.

23. The system of claim 1, wherein the sensor circuit is configured to detect the object present within the bounding surface of the selected radiative electromagnetic field spatial distribution based on information responsive to a propagation channel test between the antenna and the target device.

24. The system of claim 1, wherein the sensor circuit is configured to detect a presence of an object proximate to, at, or within the bounding surface of the selected radiative electromagnetic field spatial distribution.

25. The system of claim 1, wherein the sensor circuit is further configured to detect a location of the target device in response to an identification signal returned by the target device.

26. The system of claim 1, wherein the sensor circuit is configured to detect a presence of the object within the bounding surface of the selected radiative electromagnetic field spatial distribution in response to a signal from a tag or transponder physically associated with the object.

27. The system of claim 1, further comprising:
a wireless power transfer band selector configured to select a transfer radiofrequency sub-band available for wireless power transfer in response to a radiofrequency spectrum sensing of the transmission environment in which the antenna is located; and wherein the wireless power management circuit is further configured to initiate a wireless power transfer from the antenna to the target device using the selected sub-band.

28. The system of claim 1, wherein the countermeasure circuit is configured to select a response to the detected presence of the object from a library of the at least two selectable responses to the detected presence of the object.

29. The system of claim 1, wherein the countermeasure circuit is configured to select a response to the detected presence of the object based on trial and error, or a brute force optimization technique.

30. The system of claim 1, wherein the countermeasure circuit is configured to select a response to the detected presence of the object based on a feedback-guided optimization loop.

31. The system of claim 1, wherein the response selected by the countermeasure circuit includes a reduction of the power transmitted by the antenna in response to the detected presence of the object.

32. The system of claim 1, wherein the response selected by the countermeasure circuit includes a termination of a transmission of wireless power in response to the detected presence of the object.

33. The system of claim 1, wherein the response selected by the countermeasure circuit includes a reconfiguration of the radiative electromagnetic field spatial distribution away from the object.

34. The system of claim 1, further comprising:
a wireless power transfer management circuit configured to request the antenna to implement the another selected radiative electromagnetic field spatial distribution.

35. A system comprising:
an antenna configured to implement at least two selectable radiative electromagnetic field spatial distributions, each selectable radiative electromagnetic field spatial distribution of the at least two selectable radiative electromagnetic field spatial distributions having a respective bounding surface that describes a specified power density in the radiative electromagnetic field spatial distribution;
a spatial distribution selector circuit configured to select from the at least two selectable radiative electromagnetic field spatial distributions a radiative electromagnetic field that includes a target device present within the bounding surface of the selected radiative electromagnetic field spatial distribution;
a sensor circuit configured to detect a presence of an object within the bounding surface of the selected radiative electromagnetic field spatial distribution;
a countermeasure circuit configured to select a response to the detected presence of the object within the bounding surface of the selected radiative electromagnetic field spatial distribution; and
a wireless power transfer management circuit configured to instruct the spatial distribution selector circuit to select from the at least two selectable radiative electromagnetic field spatial distributions another radiative electromagnetic field spatial distribution that (i) includes the target device present within the bounding surface of the selected radiative electromagnetic field spatial distribution and (ii) implements the selected response to the detected presence of the object;
wherein a selectable radiative electromagnetic field spatial distribution of the at least two selectable radiative electromagnetic field spatial distributions of the antenna further includes a radiative electromagnetic field probe distribution; and
wherein the sensor circuit is configured to detect the object present within the bounding surface of a selected radiative electromagnetic field spatial distribution in response to a reflected energy from the radiative electromagnetic field probe distribution.

36. A system comprising:
an antenna configured to implement at least two selectable radiative electromagnetic field spatial distributions, each selectable radiative electromagnetic field spatial distribution of the at least two selectable radiative electromagnetic field spatial distributions having a respective bounding surface that describes a specified power density in the radiative electromagnetic field spatial distribution;

a spatial distribution selector circuit configured to select from the at least two selectable radiative electromagnetic field spatial distributions a radiative electromagnetic field that includes a target device present within the bounding surface of the selected radiative electromagnetic field spatial distribution;

a sensor circuit configured to detect a presence of an object within the bounding surface of the selected radiative electromagnetic field spatial distribution;

a countermeasure circuit configured to select a response to the detected presence of the object within the bounding surface of the selected radiative electromagnetic field spatial distribution; and a wireless power transfer management circuit configured to instruct the spatial distribution selector circuit to select from the at least two selectable radiative electromagnetic field spatial distributions another radiative electromagnetic field spatial distribution that (i) includes the target device present within the bounding surface of the selected radiative electromagnetic field spatial distribution and (ii) implements the selected response to the detected presence of the object;

wherein the sensor circuit includes another antenna configured to transmit another electromagnetic beam and receive a reflected energy from the another electromagnetic beam indicating a presence of the object within the bounding surface of the selected radiative electromagnetic field spatial distribution.

37. A system comprising:

an antenna configured to implement at least two selectable radiative electromagnetic field spatial distributions, each selectable radiative electromagnetic field spatial distribution of the at least two selectable radiative electromagnetic field spatial distributions having a respective bounding surface that describes a specified power density in the radiative electromagnetic field spatial distribution;

a spatial distribution selector circuit configured to select from the at least two selectable radiative electromagnetic field spatial distributions a radiative electromagnetic field that includes a target device present within the bounding surface of the selected radiative electromagnetic field spatial distribution;

a sensor circuit configured to detect a presence of an object within the bounding surface of the selected radiative electromagnetic field spatial distribution;

a countermeasure circuit configured to select a response to the detected presence of the object within the bounding surface of the selected radiative electromagnetic field spatial distribution; and a wireless power transfer management circuit configured to instruct the spatial distribution selector circuit to select from the at least two selectable radiative electromagnetic field spatial distributions another radiative electromagnetic field spatial distribution that (i) includes the target device present within the bounding surface of the selected radiative electromagnetic field spatial distribution and (ii) implements the selected response to the detected presence of the object;

and further comprising:

a zone protection circuit configured to detect a presence of another object within the bounding surface of the selected radiative electromagnetic field spatial distribution in response to a signal from a tag or transponder physically associated with the another object; and wherein the countermeasure circuit is configured to select a response to the detected presence of the another object within the bounding surface of the selected radiative electromagnetic field spatial distribution.

38. A system comprising:

an antenna configured to implement at least two selectable radiative electromagnetic field spatial distributions, each selectable radiative electromagnetic field spatial distribution of the at least two selectable radiative electromagnetic field spatial distributions having a respective bounding surface that describes a specified power density in the radiative electromagnetic field spatial distribution;

a spatial distribution selector circuit configured to select from the at least two selectable radiative electromagnetic field spatial distributions a radiative electromagnetic field that includes a target device present within the bounding surface of the selected radiative electromagnetic field spatial distribution;

a sensor circuit configured to detect a presence of an object within the bounding surface of the selected radiative electromagnetic field spatial distribution;

a countermeasure circuit configured to select a response to the detected presence of the object within the bounding surface of the selected radiative electromagnetic field spatial distribution; and a wireless power transfer management circuit configured to instruct the spatial distribution selector circuit to select from the at least two selectable radiative electromagnetic field spatial distributions another radiative electromagnetic field spatial distribution that (i) includes the target device present within the bounding surface of the selected radiative electromagnetic field spatial distribution and (ii) implements the selected response to the detected presence of the object;

wherein the response selected by the countermeasure circuit includes a redirection of the power transmitted by the antenna away from the object in response to the detected presence of the object.

* * * * *